(12) United States Patent
Vanini

(10) Patent No.: US 7,950,794 B2
(45) Date of Patent: May 31, 2011

(54) SOLVENT BASED INKJET INK FORMULATION

(75) Inventor: Clelia Vanini, Como (IT)

(73) Assignee: KIIAN S.p.A., Luisago (CO) (IT)

( * ) Notice: Subject to any disclaimer, the term of this patent is extended or adjusted under 35 U.S.C. 154(b) by 1036 days.

(21) Appl. No.: 11/569,671

(22) PCT Filed: May 27, 2005

(86) PCT No.: PCT/IB2005/001481
§ 371 (c)(1), (2), (4) Date: Jan. 31, 2007

(87) PCT Pub. No.: WO2005/116149
PCT Pub. Date: Dec. 8, 2005

(65) Prior Publication Data
US 2007/0263018 A1     Nov. 15, 2007

(30) Foreign Application Priority Data

May 28, 2004 (EP) .................................... 04012724

(51) Int. Cl.
*C09D 11/00* (2006.01)

(52) U.S. Cl. ...................................... 347/100; 106/31.13

(58) Field of Classification Search .................. 347/100; 106/31.13
See application file for complete search history.

(56) References Cited

U.S. PATENT DOCUMENTS

| | | | |
|---|---|---|---|
| 4,166,044 A | 8/1979 | Germonprez et al. | |
| 5,407,474 A | 4/1995 | Crooks et al. | |
| 6,391,943 B2 * | 5/2002 | Sarma et al. | 523/160 |
| 2003/0107632 A1 * | 6/2003 | Arita et al. | 347/100 |
| 2003/0203987 A1 * | 10/2003 | Nomoto et al. | 523/160 |
| 2004/0220298 A1 * | 11/2004 | Kozee et al. | 523/160 |
| 2004/0266907 A1 * | 12/2004 | Sugita et al. | 523/160 |

FOREIGN PATENT DOCUMENTS

| | | |
|---|---|---|
| EP | 0509 688 | 10/1992 |
| WO | WO 98/13430 | 4/1998 |
| WO | WO 03/027162 | 4/2003 |
| WO | WO 2004007626 A1 * | 1/2004 |

* cited by examiner

*Primary Examiner* — Laura E Martin
(74) *Attorney, Agent, or Firm* — Hess Patent Law Firm, PC; Robert J. Hess

(57) ABSTRACT

A solvent based ink formulation for inkjet printing, particularly on plastics and non-porous surfaces, including 1-40% by weight of a ketone solvent, 10-90% by weight of a mixture of cosolvents, 0.1-10% by weight of a (co)polymer binder, 0.1-10% by weight of dispersants/wetting agents, and 0.1-10% of plasticizers to give a formulation having flash point higher than 60.degree. C.

15 Claims, No Drawings

SOLVENT BASED INKJET INK FORMULATION

FIELD OF THE INVENTION

The present invention relates to a solvent based formulation for inkjet inks, i.e. for inks to be used in inkjet printers. In particular, this invention relates to ink formulations based on a system comprising one or more organic solvents as opposed to ink formulations containing radiation curable polymers, i.e. to those inks that are substantially free from solvent (so called solvent-less systems).

BACKGROUND OF THE INVENTION

Inkjet printing is a well-known technique that involves printing without the printing device contacting the printing substrate (non-impact printing). In the present invention we refer to "Drop On Demand" technology where ink drops are created only when required either thermally (thermal technology) or mechanically (piezo or valve technology) and jetted on the substrate forming small dots; the substrate can be very different, ranging from paper to plasticized substrates such as labels or vinyl or polyolefin based or coated substrates. During the printing step, the media can be heated to temperatures of up to 80° C.

Because of this peculiar printing technique, inkjet inks have technical requirements quite different from the traditional inks; more particularly, inkjet inks require very accurate control of viscosity and surface tension and sometimes of electrical conductance.

Electrical conductance is a fundamental parameter especially in Continuous Inkjet technology where drops are generated continuously and then switched to print using electrostatic devices: unlike in prior art, in the present invention electrical conductance has been considered an important parameter also in "Drop On Demand" technology.

Solvent and solvent-less ink formulations are known for ink jet printing. As is well known, in a solvent-based formulation the solvent does not react to provide a final polymer, but evaporates without entering the final dry ink formulation; contrary to this, in radiation curable ink formulations the solvent is replaced by oligomers that are cured to provide a polymer that is part of the dry ink. An example of curable, solvent-less ink formulation is disclosed in WO 03/027162, where the UV curable composition comprises a curable dispersant.

The invention formulations are solvent-based, i.e. they are substantially free from radiation curable oligomers that act as a solvent medium and the filming of the ink is obtained by evaporation of an organic solvent. The invention formulation are especially designed for inkjet printing onto a wide variety of non-porous substrates such as plastic substrates (especially vinyl substrates), but are also suitable for printing on metal, glass, ceramic, rubber and others. These ink formulations can, however, also be used onto porous media like paper and wood. Media to be printed can be either uncoated or coated with special coatings and primers Within known solvent-based inks there several problems deriving from the choice of the solvent system to be used. While water is a good solvent as far as it regards environment and hazard problems, it also is a source of drawbacks deriving from the use of water as a major solvent when paper is used as a substrate, namely paper cockle and curl, and color bleeding.

EP 0509688 discloses a water based ink formulation comprising a maximum amount of 20% of an organic solvent having low vapour pressure, 0.1 to 10 wt % of a water-soluble dye and a vehicle, the balance being water. Colour bleeding is said to be avoided by using self aggregating components such as surfactants, that can generate micellae; the application is silent about paper cockle and curl problems, that in fact were not solved.

A further problem is that water based inks have very poor performances on non-porous substrates. Water-based inks have poor adhesion on non-porous media because water has no solvency power for non-porous materials such as PVC and other plastic materials, while organic solvents have it: this means that organic solvent-based inks offer a better adhesion on these substrates than the water-based ones.

This problem became a major problem with the increase of articles to be printed on non-porous, plasticized or plastic/vinyl coated articles such as posters for outdoor advertising.

It was proposed to use organic solvents and co-solvents (diluents and thinners) to replace water, in part or completely, in the ink formulation.

WO 98/13430 discloses ink jet ink compositions comprising a binder resin that is suitable for use with ethanol or acetone, that are the preferred solvents. The disclosed formulations are all containing about 80-85 wt % of ethanol (flash point 13° C.) and/or acetone (flash point −20° C.) and are therefore highly flammable formulations. Thus, this solution proved to be not satisfactory because the amount of organic solvents required resulted in ink formulations that are classified as hazardous, often flammable and sometimes even toxic. Such ink formulations are therefore subject to the strict rules for handling said materials.

It was also proposed to use "oils" (e.g. long chain glycols, ethoxylated glycols, ethoxylated oils, ethoxylated fats, ethoxylated fatty acids, ethoxylated alcohols and hydrocarbons) to completely or partially replace water in the ink formulation; however, this solution proved to be of reduced practicity: even if these oil-based or oil-containing inks are usually non-hazardous and non-flammable and reliable in printing process (good head/nozzle stability, reliable running, minimal printer maintenance), they have insufficient versatility. In fact they are only intended for use on partially or totally absorbent substrates, while their use is not recommended on non-porous or glossy media.

U.S. Pat. No. 5,407,474 discloses an ink formulation for non porous substrates; the formulation is comprising a flux and is designed for use on glass and ceramic only and the ink has to be subjected to firing to become permanent. Thus, the ink formulation of this document has the drawback that it cannot be used on other substrates than glass and ceramic (PVC cannot be fired in an oven) and that the presence of a flux is detrimental to the ink viscosity. The solvent is selected from water, alcohol, methylethylketone and their mixtures and therefore this document relates to an ink having the same problems that are discussed above.

SUMMARY OF INVENTION

There is therefore the need for an ink comprising a solvent that can solve the above mentioned problems and is suitable for printing on non-porous substrates prevents bleeding, cockle and curling when printing on porous substrates, while avoiding hazard and flammability problems.

it is an aim of this invention to provide such an ink jet ink formulations.

This aim is achieved by means of the present invention, that relates to a formulation for inkjet ink wherein the solvent is substantially free from water and from alcohols such as methanol, ethanol and similar lower alkyl alcohols, said ink formulation comprising 0.1-10% by weight of a (co)polymer binder, 1-40% by weight of an active organic solvent that completely dissolve the resin (binder), 10-90% by weight of a mix of cosolvents, and 0.1-10% by weight of pigment, solvent and co-solvents being selected to give a formulation having flash point higher than 60° C. Other additives can be added in small amounts (up to 5%).

According to a preferred aspect of the invention, the active organic solvent is selected from ketones having high flash point, i.e. a ketones having a flash point of 40° C. or higher, and preferably of 50° C. or higher, and more preferably of 60° C. or higher. Usually, the flash point of solvents and cosolvents is within the range of 40° C. to 150° C., the flash point of the formulation being within the range of 60° C. to 150° C.

All the above flash points are measured with Tag Closed Cup method.

The high solvency power of ketones can offer improved dissolution properties at lower active solvent concentrations.

The claimed formulation provides a correct balance of the vehicle system that can also produce fast drying inks without blocking head nozzles. The system is composed by a balanced blend of more volatile and less volatile solvents and cosolvents: the first evaporate from printed film quickly to give it a fast-drying effect, while the second keep the binder dissolved inside and outside the printhead nozzles to avoid nozzle-crusting.

The formulation of the vehicle system can also provide some conductivity to the ink (conductivity larger than 1 microSiemens/cm) to dissipate static charges.

In fact the build-up of the charges that occur within the printing device can cause many problems that affect printing quality: if the jetted drops are charged and the substrate is charged too, drops can be deviated from the correct trajectory contributing to the so-called "overspray" effect: a printing defect where lines are not well shaped because small drops fall in wrong positions during the jetting.

The invention ink provides the user with several advantages over prior art inkjet inks.

A first advantage is that the invention solvent-based ink will presently be classified a "NON HAZARDOUS AND NON FLAMMABLE" material not only for labelling regulations, but also for transport regulations: this means that no special precautions are required for handling, storing and shipping it.

The invention ink is safe to use and virtually odor free so it can be used in ink-jet printers without harmful fumes or expensive ventilation equipment. The almost high boiling point (low volatility) and quite low vapour pressure (slow-evaporation rate) and the mild odour give to these solvents low emissions level in the working environment.

A further advantage of the formulation ink is its great versatility: these inks print with great results directly onto a wide range of materials, including both coated and uncoated media, and even low-quality substrates to which it securely bonds. Suitable media are all the plastic and PVC films including white and translucent, adhesive and not adhesive substrates, but also rubber, PU and ABS films and many others can be safely printed with the invention formulation.

A still further advantage of the formulation ink is the high quality of the printed images (bright colors and high definition) obtained using even a high speed print mode.

Moreover the drying speed of the printed film is very good (the solvents efficiently leave the printed film) allowing to use the "roll-to-roll" printing mode.

These are great advantages for end-users because high quality images are obtained in a shorter time, that means a higher printing productivity with high quality (without defects such as "banding" or "overspray" due to jet instability and erratic satellite and ligament formation).

Another advantage is the low maintenance required for the printing machines, due to the purity and the stability of the ink, the consistency of the ink flow through ducts, dumpers and nozzles, and the good reliability of the jetting (jet stability and no nozzle-crusting).

DESCRIPTION OF THE PREFERRED EMBODIMENTS

The inkjet ink of the present invention is a mild solvent ink with brilliant colors that produces photorealistic images that are water, scratch and light resistant: this results in the further advantage that there is no need of lamination of printed substrates, that can be used both indoor and outdoor.

The ink formulation according to the invention also show some resistance to commercial ethanol-containing cleaning products, thus making it possible to gently clean the indoor/outdoor printed substrates if necessary.

The ink formulation of the present invention typically comprises one or more active solvents, one or more cosolvents, one or more binders and one or more pigments; additives known in the art, such as dispersants, wetting agents, surface tension control agents, viscosity control agents, evaporation control agents, anti-static agents, corrosion control agents, foam control agents, film enforcing agents and plasticizers may also be present.

The ranges of the relevant amounts are summarized in the following table, where the amounts are in percent by weight on the total formulation weight.

TABLE 1

| | |
|---|---|
| active solvents | 1-40% |
| cosolvents | 10-90% |
| binders | 0.1-10% |
| pigments | 0.1-10% |
| dispersants/wetting agents | 0.1-10% |
| plasticizers | 0.1-10% |
| anti-static agents (if needed) | 0-5% |
| viscosity control agents (if needed) | 0-5% |
| evaporation control agents (if needed) | 0-5% |
| surface tension control agents (if needed) | 0-5% |
| corrosion control agents (if needed) | 0-5% |
| foam control agents (if needed) | 0-5% |
| film enforcing agents (if needed) | 0-5% |
| light stabilizers (if needed) | 0-5% |

Preferred ranges are: from 1% to 25% by weight for active solvents, 50% to 90% by weight for cosolvents, from 0.1% to 6% by weight for pigments, from 0.1% to 7% by weight for binders; all other additives (dispersants/wetting agents, light stabilizers, surface tension control agents, viscosity control agents, evaporation control agents, anti-static agents, corrosion control agents, foam control agents, film enforcing agents and plasticizers) may be present in small amounts.

An ink formulation according to the present invention has advantageous characteristics; the formulation viscosity is within the range of 4 to 50 cps, the surface tension is within the range of 25 to 50 mN/m and the evaporation rate is such as to provide a printing speed of at least 70 m$^2$/h, all these values refer to data measured at room temperature, 25° C.

Active Solvent.

As above mentioned, the active solvent is a solvent that can dissolve the resin (i.e. the binder); ketones also have a great solvency for many substrates such as vinyl and plastic substrates.

The active solvent is selected from ketones having flash-point higher than 40° C., preferably higher than 50° C., and more preferably higher than 60° C. The high solvency power of ketones can offer improved dissolution properties for the binder at lower active solvent concentrations.

In fact the binder must be dissolved in a vehicle to allow further processing and final application. If the solvent has a stronger attraction to a polymer chain than the chain has for its neighbouring chain, the secondary valency bonds between adjacent polymer chains break under the application of kinetic energy, and the invading solvent displaces each polymer chain from the next. Recombination of the polymer chains is unlikely, because the solvent molecules are populating the bonding sites.

The degree to which the molecules of this dissolved "resin solution" interact with each other and other components of the formulation gives the viscosity of the final ink formulation.

Suitable active solvents for the blend are aliphatic linear and branched ketones such as methyl n-amyl ketone, methyl iso-amyl ketone, methyl hexyl ketone, methyl heptyl ketone, 4-methoxy-4-methyl-2-pentanone, ethyl butyl ketone, ethyl amyl ketone, di-n-propyl ketone, di-iso-butyl ketone, iso-butyl heptyl ketone; cyclic ketones such as lactones (e.g. gamma-butyrolactone, gamma-valerolactone, from esa- to dodeca-lactones) cyclohexanone and its derivatives (methyl cyclohexanone, trimethyl cyclohexanone), N-methyl-2-pyrrolidone; other ketones such as diacetone alcohol, acetonyl acetone, methyl heptenone may also be used.

Preferably, the high flash-point active solvents are chosen between $C_7$-$C_{12}$ aliphatic linear or branched ketones and the family of cyclic ketones as lactones, derivatives of cyclohexanone and N-methyl-2-pyrrolidone.

Most preferably, the high flash-point active solvents are cyclic ketones such as gamma-butyrolactone or 3,3,5-trimethylcyclohexanone in a concentration within the range of 1% to 25% by weight.

Cosolvents.

Cosolvents can act also as viscosity control agents, surface tension control agents, evaporation control agents and antistatic agents determining the print quality. They can also be quite aggressive towards substrates and work with the active solvent.

The correct balance of them can also produce fast drying inks without blocking head nozzles: the more volatile cosolvents evaporate from printed film quickly to give a fast-drying effect to it, while the less volatile of them keep the ink in liquid form inside and outside the printhead nozzles to avoid nozzle-crusting by air drying.

The almost high boiling point (low volatility) and quite low vapour pressure (slow-evaporation rate) and the mild odour give to these solvents low emissions level in the working environment.

The balance of these cosolvents can also ensure some conductivity to the ink (conductivity larger than 1 microSiemens/cm) that becomes able to dissipate static charges avoiding small drops falling in wrong positions during the jetting because of electrostatic deviations.

There are two categories possible of cosolvents:
  diluents that, alone, cannot properly dissolve the resin, but work in combination with an active solvent;
  thinners that provide no solvency for the resin, but which are tolerated in blends and are used to lower viscosity.

In this invention suitable diluents are selected from esters having flash point higher than 40° C. and preferably higher than 50° C. and more preferably higher than 60° C. Preferred diluents are selected from acetates, fatty esters and mixtures thereof, carbonates and propionates.

Exemplary acetates are 2-ethyl hexyl acetate, cyclohexyl acetate, methyl cyclohexanyl acetate, oxo-hexyl acetate, oxo-heptyl acetate, ethylene glycol monoacetate, ethylene glycol diacetate, ethylene or diethylene glycol monoalkylether acetates (methyl, ethyl, propyl, butyl), propylene or dipropylene glycol monoalkylether acetates (methyl, ethyl, propyl, butyl), propylene glycol diacetate.

Fatty esters suitable for the invention comprise the $C_1$-$C_4$ esters of fatty acids, the alcohol esters of fatty acids and glycol, glycerol and polyglyceryl esters of fatty acids.

Exemplary fatty esters are butyrates, mixtures of dimethyl adipate and/or dimethyl glutarate and/or dimethyl succinate; alcohol or glycol or polyethylene glycols, glycerol or polyglyceryl laurates, oleates, stearates and palmitates.

Other suitable esters comprise acrylate esters, methacrylate esters, lactates, polyol benzoates, diethyl carbonate, propylene carbonate.

Propionate esters such as n-butyl propionate, n-pentyl propionate and ethylene glycol monoethylether propionate are also suitable.

In the present invention the preferred amount of the mixture of these diluents in the final ink formulation is comprised between 30% and 80% and they are preferably selected from quite high flash-point esters such as acetates, fatty esters and mixtures thereof, carbonates and propionates.

Referring to this invention preferred acetates can be ethylene or diethylene glycol monoalkylether acetates (methyl, ethyl, propyl, butyl), propylene or dipropylene glycol monoalkylether acetates (methyl, ethyl, propyl, butyl), propylene glycol diacetate, ethylene glycol diacetate, 2-ethylhexyl acetate.

Preferred fatty esters are mixtures of dimethyl adipate, dimethyl glutarate, dimethyl succinate called dibasic esters. In the present invention a mixture of 10-25% of dimethyl adipate, 55-65% of dimethyl glutarate and 15-25% of dimethyl succinate is preferred (all percents by weight).

The most preferred carbonate is propylene carbonate and the most preferred propionates are pentyl propionate and ethylene glycol monoethylether propionate.

Suitable thinners are selected from linear and branched aliphatic monohydric alcohols with a carbonious chain longer than $C_5$ and polyhydric alcohols, glycol ethers and their derivatives.

Preferred thinners are ethers are especially glycol ethers such as ethylene or diethylene or triethylene glycol monoalkylethers or dialkylethers (mono or di methylethers, mono or di ethylethers, mono or di propylethers, mono or di butylethers), propylene or dipropylene or tripropylene glycol monoalkylethers or dialkylethers (mono or di methylethers, mono or di ethylethers, mono or di propylethers, mono or di butylethers), ethylene glycol monophenylether, ethylene glycol monobenzylether, ethylene glycol butylphenylether, diethylene glycol divinylether, tetraethylene glycol dimethylether; propylene glycol monophenylether, propylene glycol p-cyclohexylphenylether, 1,3-butylene glycol monomethylether, divinyl ether of butanediol, methoxytriglycol, ethoxytriglycol, butoxytriglycol and glycerine ethers.

In this invention preferred thinners are derivatives of glycol ethers such as monoalkyl glycolethers and dialkyl glycolethers in a concentration from 20% to 60%; more preferably between dialkylethers dipropylen glycol dimethylether is used.

Wetting Agents and Dispersing Agents.

In the ink according to the invention, one or more surfactants can be used as dispersant, i.e. wetting agent. Suitable surfactants are known in the art and can be chosen between the anionic, non-ionic, cationic and amphoteric types.

In the present invention preferably the surfactant is anionic, non-ionic or polymeric (comb polymer or block copolymer).

Exemplary anionic surfactant are soap, ethoxy carboxylated, ester carboxylated, amide carboxylated, ester sulphonates, phosphate esters, alcohol sulphates, alcohol ether sulphates, sulphated alkanolamide ethoxylates, sulphated oils and glycerides, nonylphenol ether sulphates, ethane sulphonates, paraffin sulphonates, alkyl benzene sulphonates, fatty acid and ester sulphonates, alkyl naphtalene sulphonates, olefin sulphonates, petroleum sulphonates, lignin sulphonates and derivatives, sulphosuccinates and sulphosuccinamates, amide sulphonates.

Non-ionic surfactant can be selected between acetylenic surfactants, alcohol ethoxylates, alkanolamides, amine oxides, phosphine oxides, sulphoxides, mono/poly saccharides derivatives, ethoxylated alkanolamides, ethoxylated long-chain amines, ethylene oxide/propylene oxide copolymers, fatty acid ethoxylates, sorbitan derivatives, ethylene glycol, propylene glycol, glycerol and polyglyceryl esters plus their ethoxylated derivatives, alkyl amines, alkyl imidazolines, ethoxylated oils and fats, alkyl phenol ethoxylates.

In the present invention anionic and non-ionic surfactants are preferably used in a concentration within the range of 0.1% to 10% by weight in the final formulation, and preferably of 0.1 to 6.0%.

Binders.

One or more binders are essential in the formulation to permanently fix the pigment to the substrate: vinyl resins are preferred in this application, but also acrylic resins can be used. The amount of binder is within the range of 0.1 to 10.0%, preferably within 0.1 to 7.0% and most preferably within 0.15% to 5%, by weight of dry resin on the total formulation weight.

Films based on vinyl resins are nonoxidizing and permanently flexible and are characterized by absence of color and odor. These resins have low moisture vapor transmission rate and low order of water absorbtion, so when properly pigmented, films based on them have excellent outdoor durability.

The molecular weigth and the amount of binder in the final formulation determine the viscoelastic behaviour of the ink and its behaviour during the drop formation and during the jetting.

An amount of polymer binder higher than 8% by weight of dry resin will result in jet instability and in problems with the printhead and capping system.

Copolymers of different molecular weights are preferably selected from vinyl chloride/vinyl acetate copolymers, carboxyl-modified vinyl chloride/vinyl acetate copolymers, hydroxyl-modified vinyl chloride/vinyl acetate copolymers, epoxy-modified vinyl chloride/vinyl acetate copolymers.

In this invention vinyl chloride/vinyl acetate copolymers (modified and non-modified) with molecular weights comprised in the range of 15000 to 44000 (referenced to polystyrene standard) are preferred.

Pigments.

In the present invention organic and inorganic pigments are used to give the right colour to the inks: the selected pigments have brilliant colours that produce photorealistic images light resistant that can be used both for indoor and outdoor applications (without any lamination process).

To give the right shade to magenta ink organic pigments such as Pigment Red 2, 22, 48:1, 48:3, 49:1, 49:2, 53:1, 57:1, 81:3, 112, 122, 146, 170, 176, 184, 185; Pigment Violet 3, Pigment Violet 19, Pigment Violet 23 and others similar are used.

To give the right shade to cyan ink organic pigments such as Pigment Blue 15:0, Pigment Blue 15:3, Pigment Blue 15:4, Pigment Blue 60 and others similar are used.

To give the right shade to yellow ink organic pigments such as Pigment Yellow 1, 3, 14, 17, 55, 74, 83, 97, 120, 139, 150, 151, 155, 180 and others similar are used.

To give the right shade to black ink an inorganic pigment such as Pigment Black 7 (Carbon Black) is used.

To give the right shade to orange ink organic pigments such as Pigment Orange 5, 13, 34, 71 and others similar are used.

To give the right shade to green ink organic pigments such as Pigment Green 7 and Pigment Green 60 and others similar are used.

Many other organic pigments can be used in order to obtain the desired ink colour, but also an inorganic pigment as $TiO_2$ can be used to obtain a white ink.

These pigments are finely dispersed in the inks and their particles are characterized by a mean diameter of less than 0.2-0.3 microns.

Anti-Static Agents.

Virtually all polymeric materials as the binder or the media substrate are good insulators. As a result, they are ineffective in dissipating static charges and the gradual build-up of the charges can cause many problems that can affect printing quality: if the jetted drops are charged and the substrate is charged too, drops can be deviated from the original right trajectory producing images not correctly defined (for examples lines are not well shaped).

Inside the printing machines accumulation of static charges often happens because of the rubbing of different surfaces together (due to the quick moving of the printhead for example).

Various solutions are therefore employed to reduce or eliminate the accumulation of static charge.

In the present invention the control of the static charge in the ink can be accomplished by increasing the conductivity of the ink through incorporation of agents (solvents or additives) that themselves conduct electricity.

Additives with anti-static properties are cationic, anionic or non ionic surfactants. The most prevalent cationic agents are quaternary ammonium salts, which are most effective in polar substance such as PVC. Anionic types include alkyl sulfonates or phosphates combined with alkali metals. Non ionic types are mostly derived from fatty acid esters, ethanolamides, mono and di-glycerides and ethoxylated and propoxylated fatty amines. Due to their inherent low polarity, non ionic antistats are highly effective in polyolefin applications.

Additives with anti-static properties can be also some polymers (ex. polypyrroles) that have intrinsic conductivity that can dissipate surface charges.

It was surprisingly found that alkylcarbonate cosolvents such as propylencarbonate act also as anti-static agent and can replace at least in part the known anti-static agents in any ink formulation for inkjet printing, i.e. including known inkjet ink formulations, and in particular in ink formulations according to the present invention. A preferred anti-static cosolvent is propylencarbonate and the amount of alkylcarbonate to be used is within the range of 1 to 20%.

It therefore is an object of the present invention the use of alkylcarbonate cosolvents as anti-static agents in an ink formulation for inkjet printing.

Plasticizer.

The addition of one or more plasticizers is useful in the formulation in order to enhance flexibility and help to minimize solvent retention in the film.

When added to a polymer (the binder), they cause a decrease in its glass transition temperature that increases its workability and flexibility.

Typical plasticizers are phtalates (diisooctyl phtalate, diisodecyl phtalate, butyl benzyl phtalate, butyl-2-ethylhexyl phtalate, 2-ethylhexyl isodecyl phtalate), citrates (acetyl tributyl citrate, acetil triethyl citrate, tributyl citrate), epoxies (epoxidized soybean oil, 2-ethylhexyl epoxy tallate, epoxidized linseed oil), phosphate (tri(2-ethylhexyl)phosphate, triphenyl phosphate, tributyl phosphate) and adipate compounds. Monomeric plasticizers are more efficient than polymeric plasticizers (adipic acid polyesters, azelaic acid polyesters, sebacic acid polyesters, blown castor oil, blown soybean oil, blown linseed oil) but the last ones can provide special film characteristics such as low extractability or migration.

In the present invention the amount of plasticizer is within the range of 0.1 to 6.0% by weight in order to lower the maintenance requirements for the printing machines preventing nozzles-crusting and wipers-crusting and ensuring a correct consistency of the ink flow through ducts, dumpers and nozzles.

Additional Additives.

The addition of one or more functional additives is not required for most of applications, but if needed the formulation can also contain light stabilizers, surface tension control agents, viscosity control agents, evaporation control agents, anti-static agents, corrosion control agents, foam control agents and film enforcing agents in small amounts.

All the formulation components provide an ink with surface tension preferably controlled from 25 mN/m to 50 mN/m (obtained by using proper surfactants and cosolvents), viscosity preferably within the range of 3 to 50 centipoises (obtained by using proper binders and cosolvents) and conductivity larger than 1 microSiemens/cm (obtained by using proper anti-static agents and/or and cosolvents).

The invention will now be further described with reference to the following non-limiting examples.

EXAMPLE 1

A resin (binder) solution is obtained by dissolving under stirring 20% by weight of a non-modified vinyl chloride/vinyl acetate copolymer with molecular weight 22000 (referenced to polystyrene standard) in 3,3,5-trimethylcyclohexanone (80% by weight).

A pigmented dispersion is also prepared, by dispersing and milling Pigment Red 122 (15% by weight) in ethylene glycol monobutylether acetate using a non-ionic surfactant as wetting/dispersing agent. The final dispersion has mean diameter of the particles of less than 0,3 microns (average).

The resin solution is then added to the pigmented dispersion by stirring and then a phtalate plasticizer is added, always by stirring.

Finally, 2-ethylhexyl acetate, propylene glycol diacetate, propylencarbonate and dipropylen glycol dimethylether are added under stirring.

The ink formulation of example 1 is:

| | |
|---|---|
| Resin solution | 8% by weight |
| Pigmented dispersion | 15% by weight |
| Di-octylphtalate | 2% by weight |
| 2-Ethylhexyl acetate | 15% by weight |
| Propylene glycol diacetate | 12% by weight |
| Propylencarbonate | 18% by weight |
| Dipropylen glycol dimethylether | 30% by weight |

The ink is then filtered with a sub-micron absolute filter (for example 0.6 micron porosity).

The flash point of the formulation (Tag Closed Cup) is 63° C.

The ink so obtained is presently classified as an "NON HAZARDOUS AND NON FLAMMABLE" material not only for labelling regulations, but also for transport regulations and has great versatility: it prints with great results directly onto a wide range of materials, including both coated and uncoated media, and even low-quality substrates to which it securely bonds with no "mottling" defects (i.e. ink drops do not coalesce on the media surface avoiding uneven density).

A still further advantage of this ink is the high quality of the printed images (bright color and high definition) obtained using even a high speed print mode.

Moreover the drying speed of the printed film is very good (the solvents leave the printed film efficiently) allowing to use the roll-to-roll printing mode.

Another advantage is the low maintenance required for the printing machines, due to the purity and the stability of the ink, the consistency of the ink flow through tubes, dumpers and nozzles, and the good reliability of the jetting (jet stability and no nozzle-crusting).

EXAMPLE 2

A resin solution is obtained by dissolving under stirring 20% by weight of a hydroxyl modified vinyl chloride/vinyl acetate copolymer with molecular weight of 15000 (referenced to polystyrene standard) in 3,3,5-trimethylcyclohexanone (80% by weight).

A pigmented dispersion is also prepared dispersing and milling Pigment Blue 15:3 (15% by weight) in ethylene glycol monobutylether acetate using a non-ionic surfactant as wetting/dispersing agent. The final dispersion must have a finess of less than 0,3 microns (mean diameter).

The resin solution is then added to the pigmented dispersion by stirring and then a phtalate plasticizer is added always under stirring.

Finally a cosolvents mixture of fatty esters comprising 10-25% of dimethyl adipate, 55-65% of dimethyl glutarate and 15-25% of dimethyl succinate (DiBasicEster), ethylene glycol monobutylether acetate, propylencarbonate and the thinner (dipropylen glycol dimethylether) are added under stirring.

The ink formulation of example 2 is:

| | |
|---|---|
| Resin solution | 8.5% by weight |
| Pigmented dispersion | 15% by weight |
| Di-octylphtalate | 3% by weight |
| Ethylene glycol monobutylether acetate | 5% by weight |
| DiBasicEster | 15% by weight |
| Propylencarbonate | 19% by weight |
| Dipropylen glycol dimethylether | 34.5% by weight |

The ink is then filtered with a sub-micron absolute filter (for example 0,6 micron porosity).

The flash point of the formulation (Tag Closed Cup) is 64° C.:

The ink so obtained can be classified as "NON HAZARDOUS AND NON FLAMMABLE" material not only for labelling regulations, but also for transport regulations and has great versatility.

A still further advantage of this ink is the high quality of the printed images (bright color and high definition) obtainable even when using a high speed print mode: thanks to the quite high conductivity of this formulation (greater than 2 microSiemens/cm) no "overspray" defect can be detected.

Moreover the drying speed of the printed film is very good and the maintenance required for the printing machines is low.

The invention claimed is:

1. An ink formulation for ink jet printing, which is free from water and from lower alkyl alcohols, comprising
   1-25% by weight of one or more active solvents selected from C7-C12 aliphatic linear or branched ketones, cyclic ketones as lactones and derivatives of cyclohexanone, pyrrolidones and mixtures thereof,
   50-90% by weight of a mixture of cosolvents comprising diluents that are esters selected from the group consisting of acetates, mixtures of fatty acid esters, carbonates and propionates and mixtures thereof, in an amount within a range of 30 to 80% by weight of the ink formulation, and thinners selected from monoalkyl glycolethers and dialkyl glycolethers in an amount within a range of 20% to 60% by weight of the ink formulation,
   0.1-10% by weight of a binder selected from a group consisting of vinyl resins,
   0.1-10% by weight of dispersants/wetting agents, and
   0.1-10% by weight of pigments; the ink formulation having a flash point higher than 60° C.

2. An ink formulation according to claim 1, wherein said active solvent amount is within the range of 5% and 15% by weight and said solvent is a cyclic ketone selected from gamma-butyrolactone, 3,3,5-trimethylcyclohexanone and mixtures thereof.

3. An ink formulation according to claim 1, wherein said diluents are selected from ethylene or diethylene glycol monoalkylether acetates (methyl, ethyl, propyl, butyl), propylene or dipropylene glycol monoalkylether acetates (methyl, ethyl, propyl, butyl), propylene glycol diacetate, ethylene glycol diacetate, 2-ethylhexyl acetate and mixtures thereof.

4. An ink formulation according to claim 1, wherein said mixture of fatty esters comprises 10-25% of dimethyl adipate, 55-65% of dimethyl glutarate and 15-25% of dimethyl succinate; said carbonate is propylene carbonate and said propionates are selected from pentyl propionate and ethylene glycol monoethylether propionate.

5. An ink formulation according to claim 1, wherein said thinner is dipropylene glycol dimethylether.

6. An ink formulation according to claim 1, wherein a viscosity of the formulation is within a range of 3 to 50 cps, a surface tension of the formulation is within a range of 25 to 50 mN/m and an evaporation rate of the formulation is such as to provide a printing speed of at least 70 m/h.

7. An ink formulation according to claim 1, wherein the (co)polymer binder is a vinyl chloride/vinyl acetate copolymer having a molecular weight within a range of 15000 to 44000 (referenced to polystyrene standard) and a concentration within a range of 0.1%-7% by weight.

8. An ink formulation according to claim 1, wherein the ink has conductivity larger than 1 microSiemens/cm.

9. An ink formulation according to claim 8, wherein one of the cosolvents is propylene carbonate cosolvent in an amount within a range of 1 to 20% by weight.

10. An ink formulation according to claim 9, wherein the formulation includes anti-static agents within a range of 0 to 5% by weight.

11. An ink formulation according to claim 1, wherein the pigments are selected from organic and/or inorganic pigments having mean particle diameter of less than 0,3 microns, an amount of said pigments being within a range of 0.1% to 6% by weight.

12. An ink formulation according to claim 1, wherein said dispersants/wetting agents include an anionic or non-ionic surfactant within a range of 0.1% to 6% by weight.

13. An ink formulation according to claim 1, comprising alkylcarbonate cosolvents as anti-static agents in an ink formulation.

14. An ink formulation according to claim 13, wherein said alkylcarbonate cosolvents include a propylene carbonate in an amount within a range of 1 to 20% by weight.

15. An ink formulation according to claim 1, wherein the formulation includes anti-static agents within a range of 0 to 5% by weight.

* * * * *